United States Patent
Calfa et al.

(10) Patent No.: US 6,849,011 B2
(45) Date of Patent: Feb. 1, 2005

(54) ENGINE ENDLESS DRIVE BELT TENSIONER AND TENSIONER POSITION INDICATOR

(75) Inventors: Jeffrey P. Calfa, Naperville, IL (US); Alan H. Manara, Redondo Beach, CA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 111 days.

(21) Appl. No.: 10/303,239

(22) Filed: Nov. 23, 2002

(65) Prior Publication Data

US 2004/0102272 A1 May 27, 2004

(51) Int. Cl.[7] .............................. F16H 7/22; F16H 7/12
(52) U.S. Cl. ..................... 474/102; 474/101; 474/135
(58) Field of Search ................ 474/109–112, 133–139, 474/102–103, 69, 70; 198/810.04, 644; 180/206

(56) References Cited

U.S. PATENT DOCUMENTS

| 2,182,267 A | 12/1939 | Scusa |
| 2,471,999 A | 5/1949 | Boos |
| 3,177,708 A | 4/1965 | Saxl |
| 3,494,183 A | 2/1970 | Sokolosky |
| 4,141,245 A | * 2/1979 | Brandstetter ................. 474/135 |
| 4,362,062 A | 12/1982 | Peterson |
| 4,478,595 A | * 10/1984 | Hayakawa et al. ......... 474/109 |
| 5,284,116 A | 2/1994 | Richeson, Jr. |
| 5,733,214 A | * 3/1998 | Shiki et al. ................. 474/139 |
| 5,918,729 A | * 7/1999 | Chang .................... 198/810.04 |
| 5,941,483 A | 8/1999 | Baginski |
| 6,364,044 B1 | * 4/2002 | Juan ........................... 474/133 |

FOREIGN PATENT DOCUMENTS

| EP | 1 158 287 A | * 11/2001 | .......... G01M/13/02 |
| FR | 2 83 2201 A1 | * 5/2003 | ............. F16H/7/08 |
| JP | 62-93556 A | * 4/1987 | ................. 474/135 |
| JP | 02-118252 A | * 5/1990 | ................. 474/112 |
| WO | WO 00/00756 A1 | * 1/2000 | ............. F16H/7/08 |

* cited by examiner

*Primary Examiner*—Marcus Charles
(74) *Attorney, Agent, or Firm*—Jeffrey P. Calfa; Dennis Kelly Sullivan; Susan L. Lukasik

(57) ABSTRACT

Engine accessory drive belt tension is maintained by a spring loaded roller positioned to impinge against the belt. Belt deflection is reflected by changes in position of the roller, and measured by a deflection sensor. Changes in deflection may indicate changes in belt elasticity, indicating the possible need to change the belt.

9 Claims, 7 Drawing Sheets

FIG. 9A
FIG. 9B
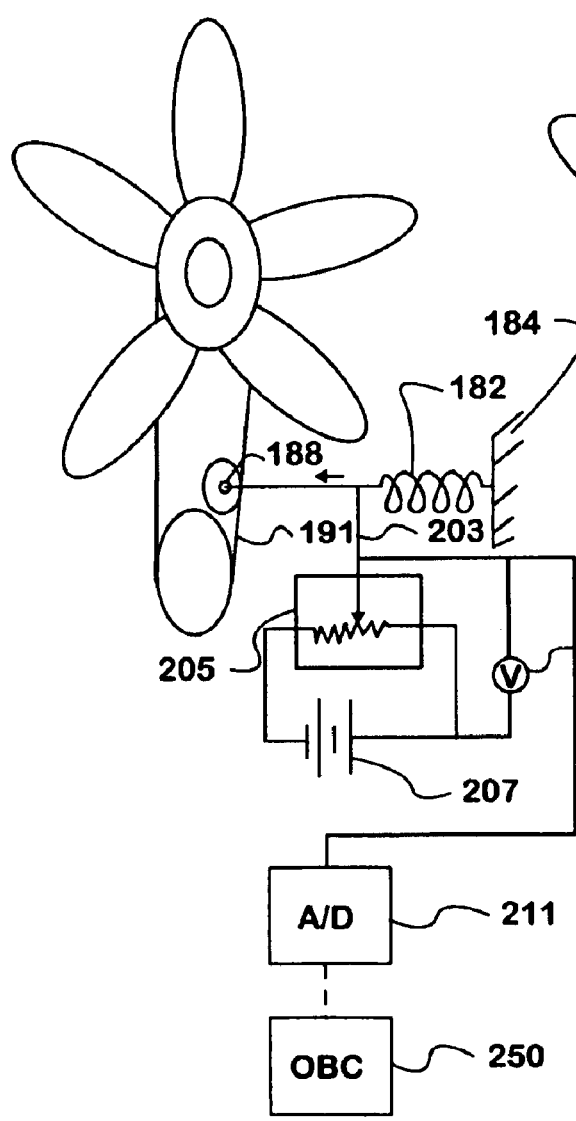
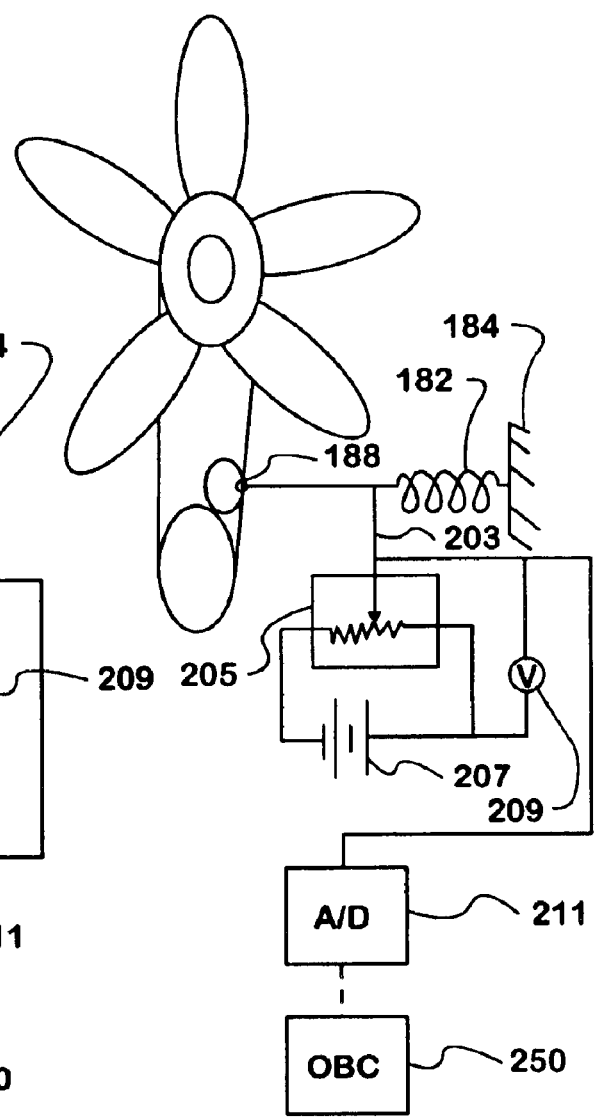

US 6,849,011 B2

ENGINE ENDLESS DRIVE BELT TENSIONER AND TENSIONER POSITION INDICATOR

BACKGROUND OF THE INVENTION

1. Field of the Invention

The present invention relates to endless transmission belts and more particularly to a belt tensioner and tensioner position indicating device for developing an indication of the condition of the endless transmission belt.

2. Description of the Problem

Front end accessory components for a truck engine, such as an air conditioning compressor, a power steering pump, an alternator and a cooling fan, and internal engine components such as cam shafts and oil pumps, are often driven by one or more endless transmission belts installed between a rotatable element of the vehicle's engine, typically the engine crankshaft, and a pulley for the driven component. It is undesirable for these belts to slip since slip produces, belt wear, frictional losses and loss of output from the driven component. In addition, slip can indicate the possible deterioration of the belt and its possible separation or detraining from its pulleys. Maintaining belt tension reduces slip and extends the life of endless transmission belts by taking slack out of the endless loop. However, simply maintaining tension on a belt becomes less effective with aging of the belt due the belt's loss of elasticity.

Good belt operation is considered important enough that checking belt tension has been made part of the commercial vehicle standard pre-trip inspection. Drivers have had to feel the belts to determine belt tightness, unless a belt is so loose that a gap is visually detectable. However, belt slippage due to deterioration in the condition of the belt can occur before a loose belt becomes detectable by touch or sight. Direct inspection can also be cumbersome, involving the movement of heavy or large hoods to reach the locations of the various belts. For a driver who suffers from impaired mobility, these tasks can be very difficult and time consuming.

SUMMARY OF THE INVENTION

The invention provides a drive belt tensioner and belt deflection detector for a vehicle engine comprising a tensioner anchor mounted with respect to the engine. A flexing element is mounted on the tensioner anchor. A tensioner pulley depends from the flexing element and is biased by the flexing element into contact with a drive belt. A deflection sensor is positioned with respect to the flexing element to indicate changes in position of the flexing element reflecting changes in deflection of the drive belt.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 9A–B are schematics of a second deflection measuring apparatus adapted for use with the second embodiment of the tensioner.

DETAILED DESCRIPTION OF THE INVENTION

Figure 1:
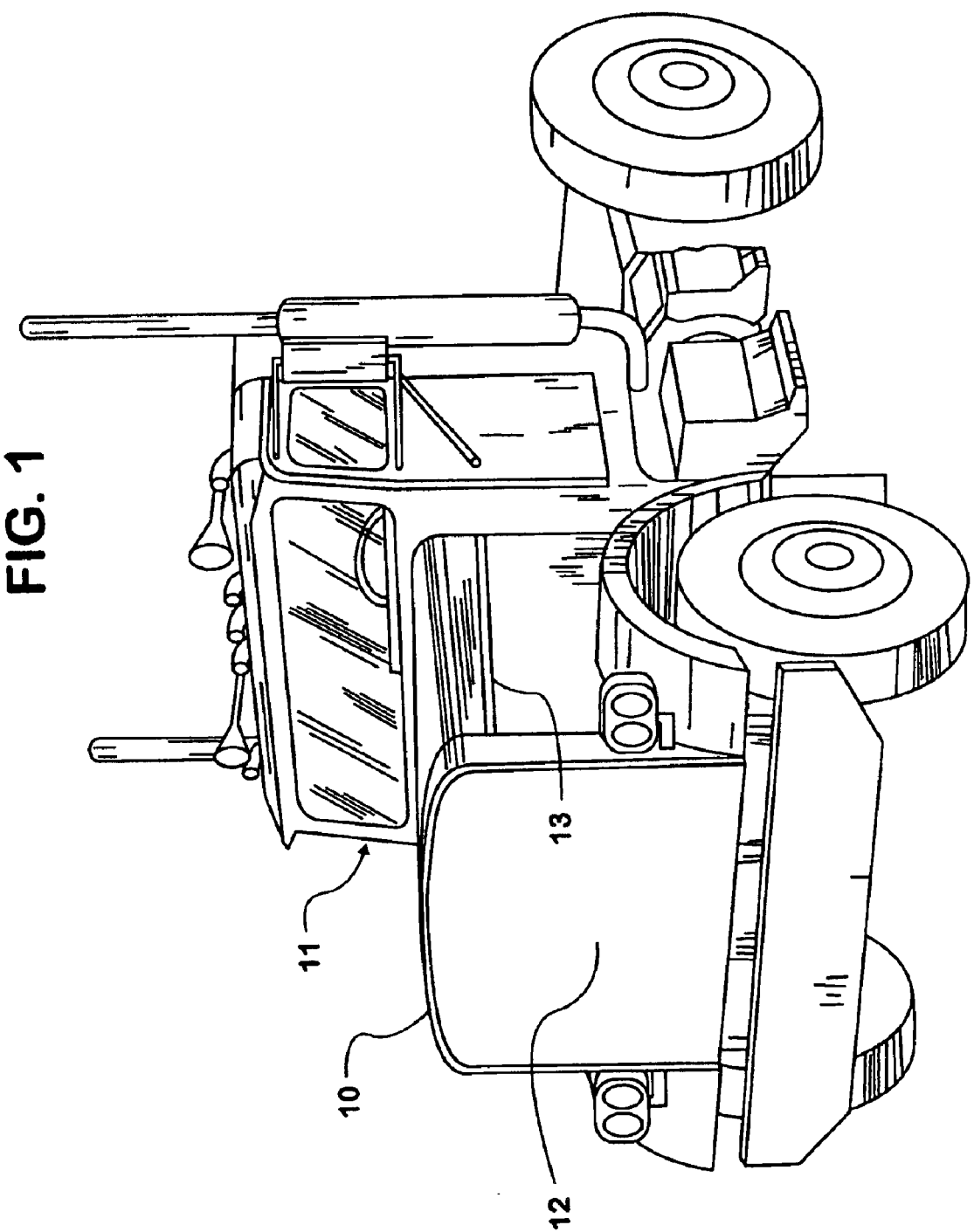
FIG. 1 is a perspective view of a truck tractor.

FIG. 1 illustrates in perspective a truck tractor 10 comprising a cab 11 and an engine housing 12. Engine housing 12 encloses an engine under a heavy, folding hood 13, which must be lifted for access to many engine related components and drive belts, the condition of which must be monitored as part of commercial vehicle pre-trip inspections.

Figure 2:
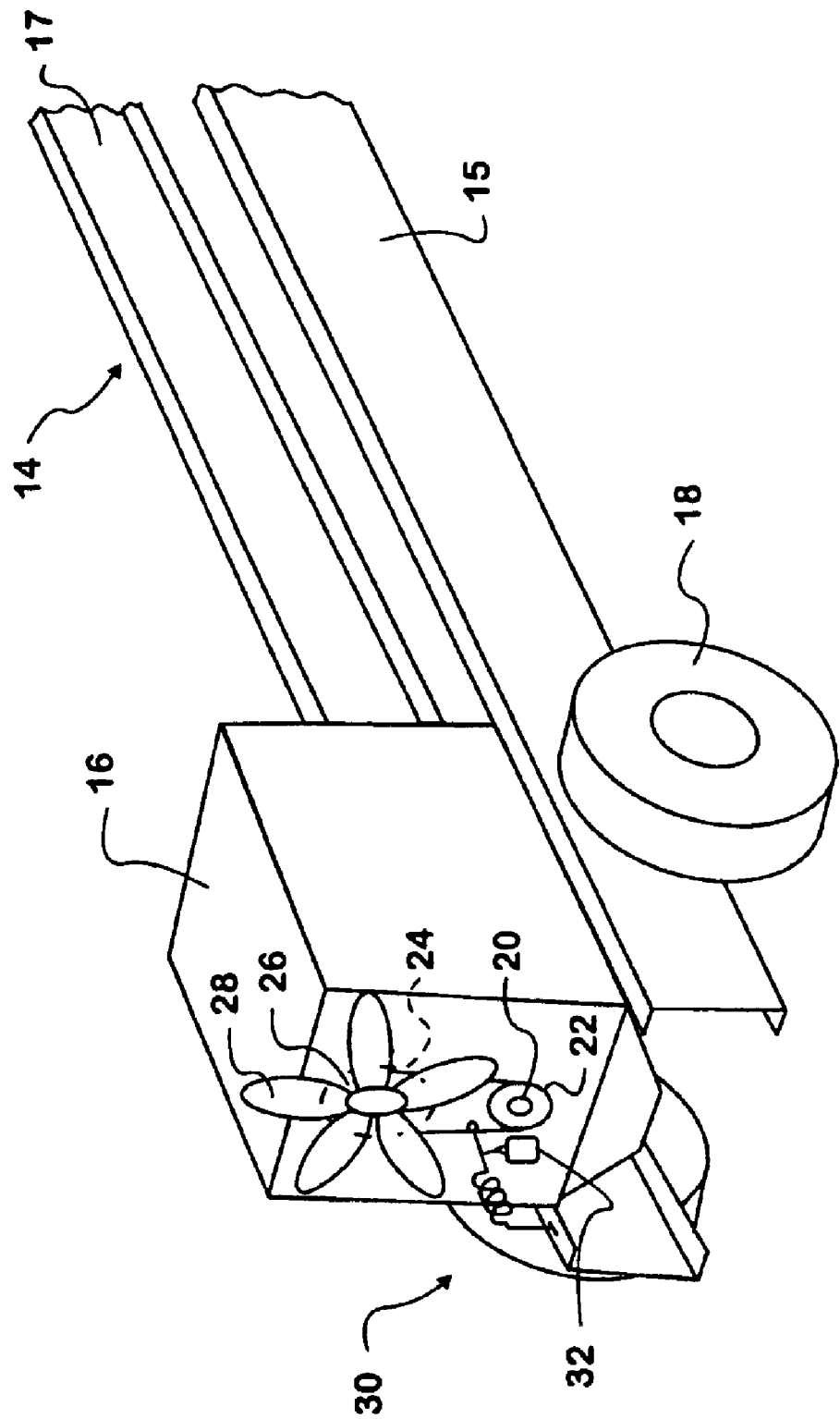
FIG. 2 is a perspective view of the front portion of a truck tractor chassis.

Referring now to FIG. 2, a portion of a vehicle chassis 14 is illustrated comprising two side rails 15 and 17 with an engine 16 supported between the rails. The side rails 15 and 17 are in turn supported from wheels 18 arranged outside of the side rails. A crankshaft 20 extends from the front of engine 16. A drive pulley 22 is fitted to crankshaft and a driven pulley 26 is positioned above pulley 22 for driving a cooling fan 28. An endless drive belt 24 is fitted around pulleys 22 and 26 allowing fan 28 to be driven by crankshaft 22. Fan 28 is an example of one of many types of accessories that can be driven by a drive belt, others including air conditioning compressors, water pumps, power steering pumps, superchargers, etc. Endless drive belt 24 is kept under tension by a tensioning mechanism 30, which is shown mounted to side rail 17, but which may be positioned on any fixed point of the vehicle. Tensioning mechanism 30 comprises a spring element for deflecting endless belt 24. The degree of deflection is detected by a deflection sensor 32.

Figure 3:
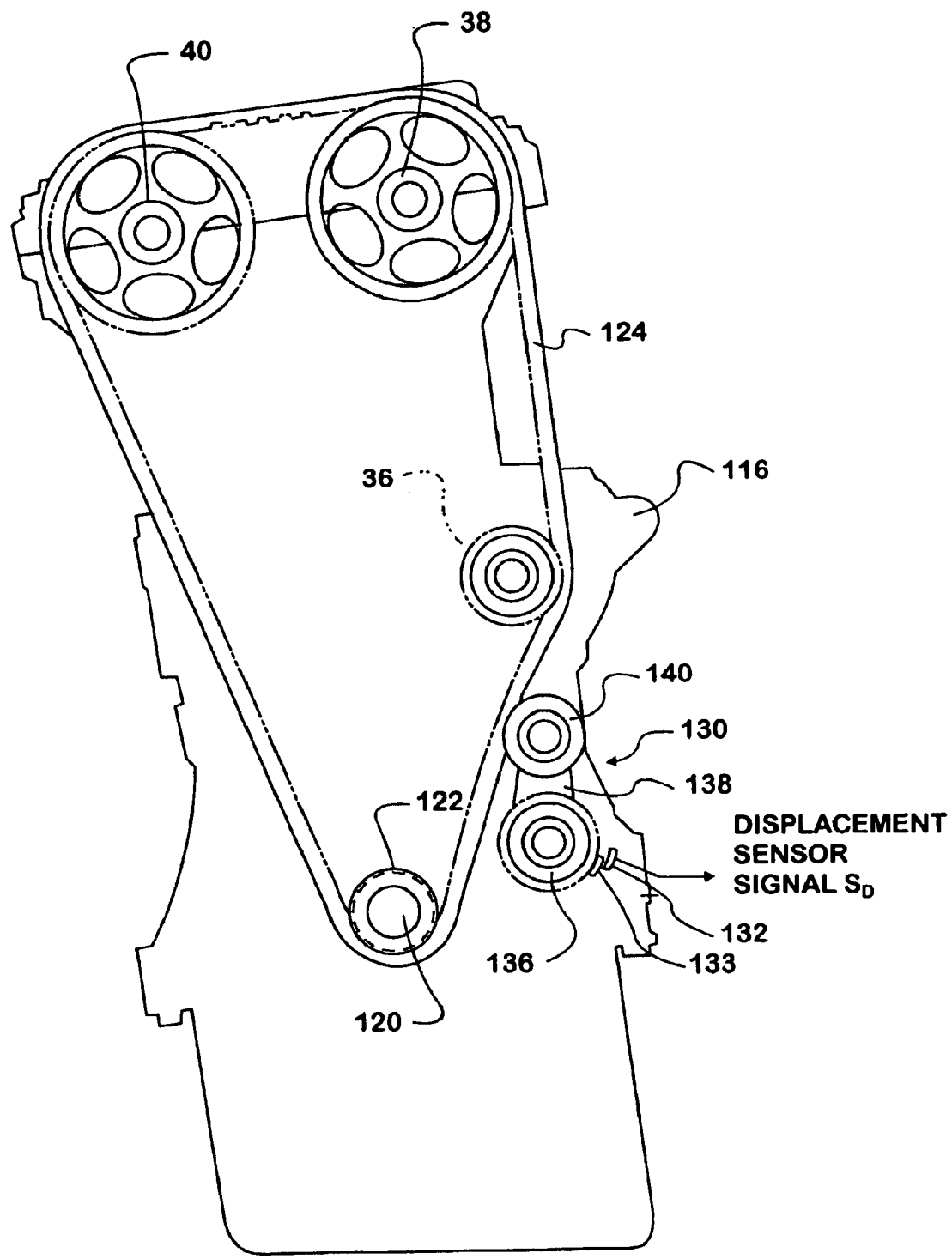
FIG. 3 is a front elevation of an engine equipped with the tensioner and deflection measuring apparatus of the invention in accordance with a first embodiment thereof.

Referring now to FIG. 3, one of the preferred embodiments of a belt tensioner 130 and deflection detection apparatus 132 are disclosed supported on an engine 116. An endless drive belt 124 is fitted around pulleys 122, 36, 38 and 40. Pulley 122 is driven by crankshaft 120. Pulleys 36, 38 and 40 drive vehicle accessories or other engine components, such as camshafts. Tensioning mechanism 130 includes a tensioning roller 140 which is urged against belt 124 between pulleys 122 and 36 keeping the belt under tension. Tensioning roller 140 is mounted at the end of a swinging arm 138, which extends from a rotatable base element 136. Base element 136 is spring loaded to urge arm 138 in a counterclockwise direction toward belt 124. Rotatable base element 136 carries a sensor target 133 which passes a sensor 132 to provide an indication of the rotational position of tensioning mechanism 130.

Figure 4:
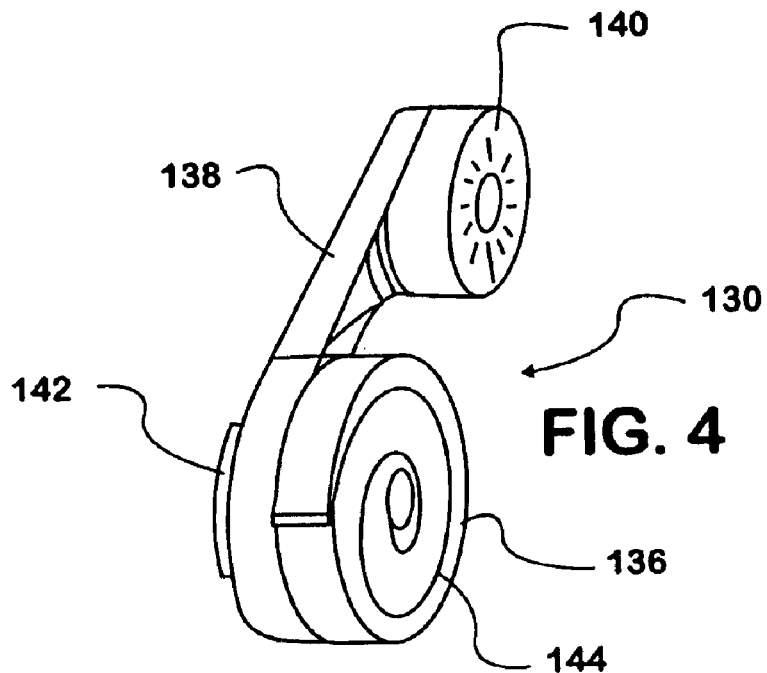
FIG. 4 is a perspective view of a swing tensioner in accordance with the embodiment of FIG. 3.
Figure 5:
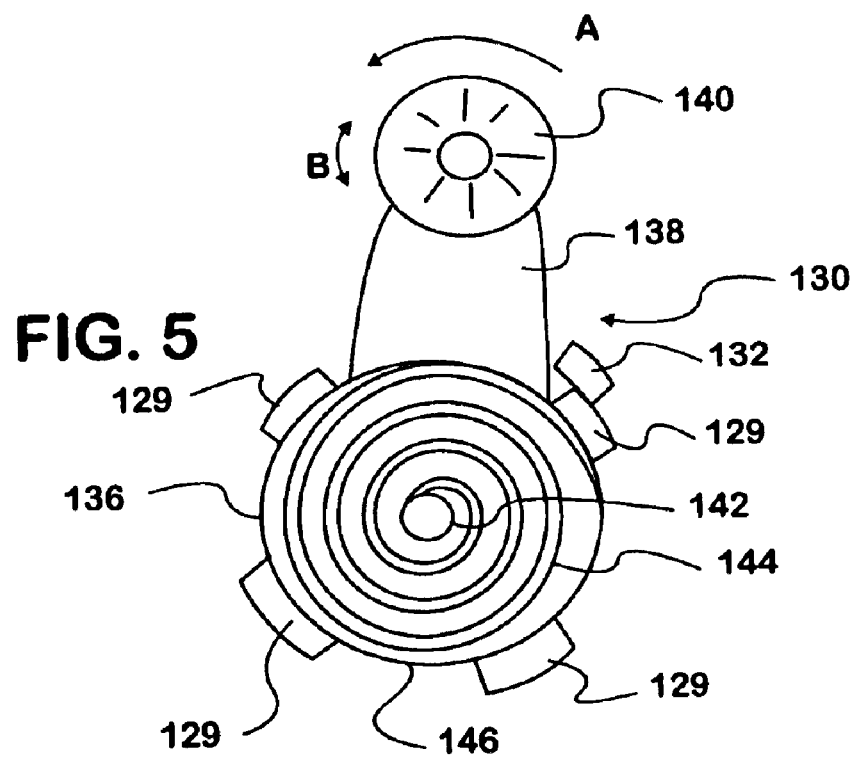
FIG. 5 is a front elevation of a swing tensioner and deflection measuring apparatus in accordance with the embodiment of FIG. 3.
Figure 6:
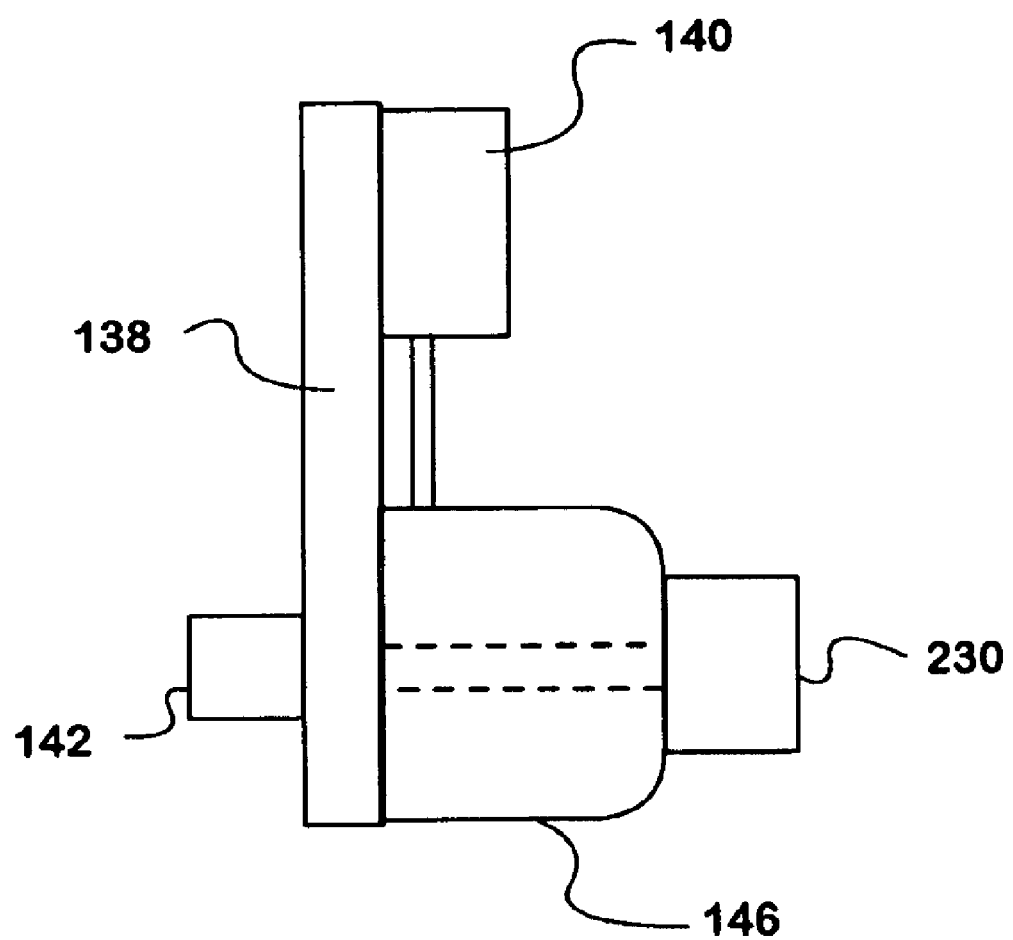
FIG. 6 is a side elevation of a swing tensioner and deflection measuring apparatus.

FIGS. 4, 5 and 6 illustrate a tensioning mechanism 130 in greater detail. Tensioning mechanism 130 may be anchored by its base 142 on an engine, fixed plate or segment of the vehicle's frame, so that its position relative to the crankshaft is fixed. Rotatable element 136 rotates on base 142. Rotation is limited by, and biased in a preferred direction, by a coil spring 144 wound between base 142 and a perimeter ring 146. Arm 138, which extends from the perimeter ring 146, rotates in a direction A as urged by spring 144 until a pulley or roller 140, mounted on the free swinging end of arm 138, comes into contact with a belt. Taken together, rotational element 136 and arm 138 flex to tense a belt against which roller 140 rides. Roller 140 is mounted for rotation on the free end of arm 138 as indicated by double arrow B.

In FIG. 5 a deflection sensor is implemented by providing a plurality of sensor targets 130, distributed around the outside of perimeter ring 146. These sensor targets 130 may be magnets, used to complete inductance circuits with a electro-magnetic sensor 132, which the sensors targets pass with changes in the position of rotational element 138. Changes in the inductance of the electro-magnetic sensor are readily detectable allowing the rotational position of rotational element 136 to determined continuously. The rotational position of element 136 directly tracks changes in the deflection of a drive belt. Alternatively, targets 130 may be simple throws toggling the position of a switch 132 to indicate whether the deflection of a drive belt has fallen below a minimum desired degree, indicating loss of elasticity. FIG. 6 illustrates yet another alternative for the deflection/displacement sensor embodied in a rotating potentiometer 230 mounted over coil spring 144 on rotating element 136.

Figure 7:
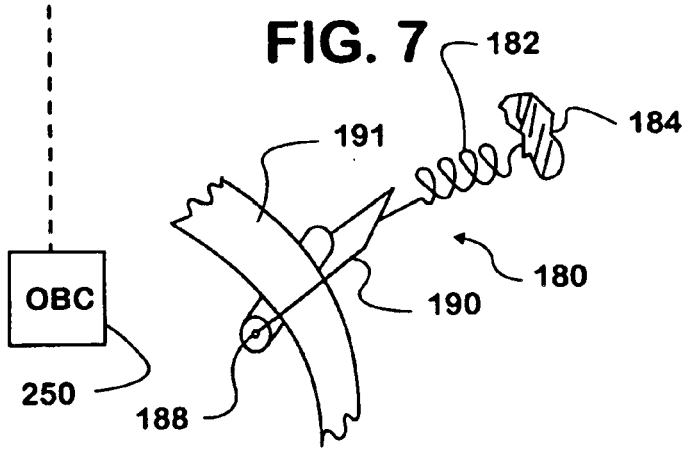
FIG. 7 is a perspective view of a tensioner in accordance with a second embodiment of the invention.

FIG. 7 illustrates a linear tensioner 180 implemented using a flexing element 182 which here may be a spring. Flexing element 182 is anchored at one end in a structure 184 which may be the engine or a section of the vehicle's frame. The other, free end of flexing element 182 terminates in a flexing element to belt connector 186 implemented using a roller 188 set for rotation in a hanger 190. Roller 188 impinges on belt 191 deflecting the belt to apply tension thereto.

Figure 8B:
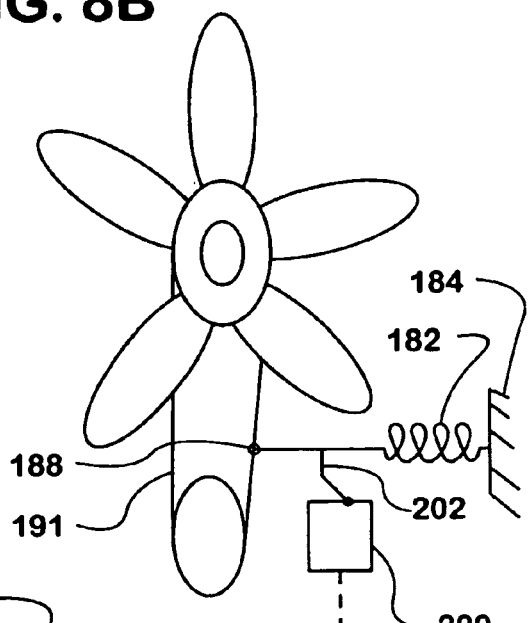
FIGS. 8A–B are schematics of a deflection measuring apparatus suitable for use with the second embodiment of the tensioner.
Figure 8A:
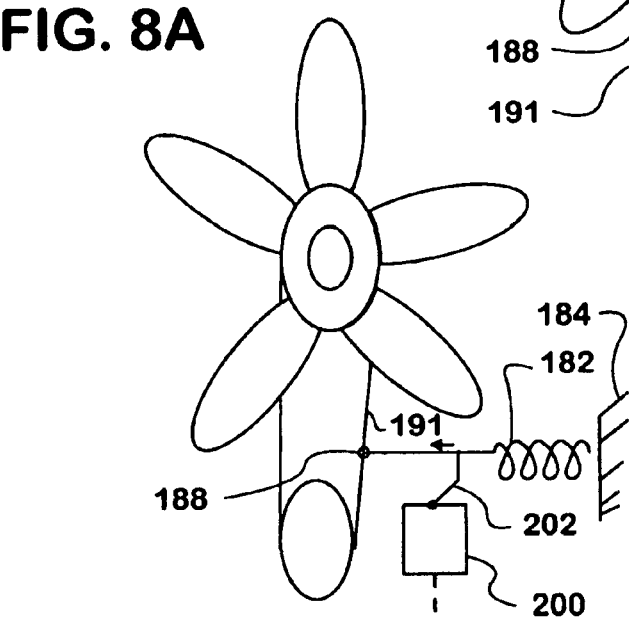

FIGS. 8A–B illustrate the use of a two position switch 200 having a toggle lever 202 which moves with changes in extension of the flexing element 182 responding to changes in the deflection of belt 191 occurring with the belt's changes in elasticity. The state of switch 200 is provided to a vehicle onboard computer 250. A more complex arrangement is illustrated in FIGS. 9A–B allowing the degree in change in deflection to be monitored. Here a fixed point on flexible element is associated with a sliding contact 203 on resistor 205. Resistor 205 is connected in parallel with a constant voltage source 207. The voltage between the sliding contact 203 and a terminal of the constant voltage source 207 is measured by voltmeter 209 and reflects changes in extension of flexing element 182. Voltage readings from voltmeter 209 are provided an analog to digital converter 211 before being passed to the vehicle's onboard computer 250. Programming of onboard computer 250 allows the computer to equate particular voltage levels with condition or loosening of belt 191.

A variety of sensors may be used to accomplish the task of measuring changes in belt deflection. These include potentiometers, non-contacting proximity magnetic sensors of either the linear or angular sort, or in general any sensor that measures displacement. The present invention provides an engine accessory belt tension indication mechanism which indicates both belt tension and possible loss of belt elasticity without the need to open a vehicle hood. The primary function of the tensioner is not applying tension to the belt, although it can provide that function, but rather its purpose is to keep the flexing element tautly stretched between a fixed point on the vehicle and the belt. This allows changes in belt deflection to be detected.

While the invention is shown in only one of its forms, it is not thus limited but is susceptible to various changes and modifications without departing from the spirit and scope of the invention.

What is claimed is:

1. A drive belt tensioner and deflection sensor for a vehicle engine comprising:
   a tensioner anchor mounted with respect to the engine;
   a flexing element mounted on the tensioner anchor;
   a tensioner pulley depending from the flexing element and biased by the flexing element into contact with a drive belt; and
   a position sensor positioned with respect to the flexing element to indicate changes in extension of the flexing element reflecting changes in deflection of the drive belt;
   the position sensor engaged to a vehicle onboard computer;
   a fixed point on the flexing element associated with a sliding contact on a resister, the resister being connected in parallel with a constant voltage source, a voltage between the sliding contact and a terminal of the constant voltage source being measured by a voltmeter and reflecting changes in extension in the flexing element; and
   programming in the vehicle onboard computer for equating changes in extension with condition of the drive belt.

2. A drive belt tensioner and deflection sensor for a vehicle engine as set forth in claim 1, the flexing element further comprises a spring.

3. A drive belt tensioner for a vehicle engine as set forth in claim 2, the spring providing for linear translation of the tensioner pulley.

4. A drive belt tensioner and deflection sensor for a vehicle engine comprising:
   a tensioner anchor mounted with respect to the engine;
   a flexing element mounted on the tensioner anchor;
   a tensioner pulley depending from the flexing element and biased by the flexing element into contact with a drive belt;
   a position sensor positioned with respect to the flexing element to indicate changes in extension of the flexing element reflecting changes in deflection of the drive belt;
   the flexing element comprising, a rotatable arm with the tensioner pulley mounted at a free swinging end of the arm and the other end being pivotally mounted to the tensioner anchor;
   the position sensor comprising a plurality of sensor targets distributed around the outside of a perimeter ring, the sensor targets used to complete inductance circuits with an electro-magnetic sensor, that the sensor targets pass with changes in a position of the rotable arm.

5. A motor vehicle engine comprising:
   a tensioner anchor mounted on the motor vehicle engine;
   a plurality of accessories positioned with respect to the motor vehicle engine;
   a crankshaft having an exposed end;
   a drive pulley mounted on an exposed end of the crankshaft;

a driven pulley for powering each of the plurality of accessories;

an endless drive belt mounted on the drive and driven pulleys;

a flexing element mounted from the tensioner anchor;

a flexing element to drive belt connector depending from the flexing element and biased by the flexing element into contact with a drive belt; and a deflection sensor positioned with respect to the flexing element to indicate changes in position of the flexing element reflecting changes in deflection of the drive belt;

the position sensor engaged to a vehicle onboard computer;

a fixed point on the flexing element associated with a sliding contact on a resister, the resister being connected in parallel with a constant voltage source, a voltage between the sliding contact and a terminal of the constant voltage source being measured by a voltmeter and reflecting changes in extension in the flexing element; and programming in the vehicle onboard computer for equating changes in extension with condition of the drive belt.

6. A motor vehicle engine as set forth in claim 5, the flexing element further comprises a spring.

7. A drive belt tensioner for a vehicle engine as set forth in claim 6, the spring providing for linear translation of the tensioner pulley.

8. A motor vehicle engine comprising:

a tensioner anchor mounted on the motor vehicle engine;

a plurality of accessories positioned with respect to the motor vehicle engine;

a crankshaft having an exposed end;

a drive pulley mounted on an exposed end of the crankshaft;

a driven pulley for powering each of the plurality of accessories;

an endless drive belt mounted on the drive and driven pulleys;

a flexing element mounted from the tensioner anchor;

a flexing element to drive belt connector depending from the flexing element and biased by the flexing element into contact with a drive belt;

a deflection sensor positioned with respect to the flexing element to indicate changes in position of the flexing element reflecting changes in deflection of the drive belt;

the flexing element comprising a rotatable arm with the tensioner pulley mounted at a free swinging end of the arm and the other end being pivotally mounted to the tensioner anchor;

the position sensor comprising a plurality of sensor targets distributed around the outside of a perimeter ring, the sensor targets used to complete inductance circuits with an electro-magnetic sensor, that the sensor targets pass with changes in a position of the rotable arm.

9. A motor vehicle engine comprising:

a tensioner anchor mounted on the motor vehicle engine;

a plurality of accessories positioned with respect to the motor vehicle engine;

a crankshaft having an exposed end;

a drive pulley mounted on an exposed end of the crankshaft;

a driven pulley for powering each of the plurality of accessories;

an endless drive belt mounted on the drive and driven pulleys;

a flexing element mounted from the tensioner anchor;

a flexing element to drive belt connector depending from the flexing element and biased by the flexing element into contact with a drive belt; and a deflection sensor positioned with respect to the flexing element to indicate changes in position of the flexing element reflecting changes in deflection of the drive belt;

the position sensor engaged to a vehicle onboard computer; and the position sensor comprising a two position switch moving with changes of extension of the flexing element responding to changes in deflection of the drive belt and occurring with the belt's changes in elasticity.

* * * * *